Dec. 31, 1968

E. MILLNER 3,419,135

SCREW CLIP OR THE LIKE INCLUDING HEADLESS SCREWS
WITH CYLINDRICAL BORE DRIVING MEANS

Filed Oct. 26, 1965

INVENTOR
ELLIOTT MILLNER

BY Arnold G. Gulko

ATTORNEY

United States Patent Office 3,419,135
Patented Dec. 31, 1968

3,419,135
SCREW CLIP OR THE LIKE INCLUDING HEADLESS SCREWS WITH CYLINDRICAL BORE DRIVING MEANS
Elliott Millner, 16 Wildwood Road, Hartsdale, N.Y. 10530
Filed Oct. 26, 1965, Ser. No. 505,295
2 Claims. (Cl. 206—56)

ABSTRACT OF THE DISCLOSURE

A plurality of externally threaded headless screws of uniform major and minor diameters throughout the length thereof being joined together in a clip or in stack form. Each of the screws is provided with a cylindrical bore at one end thereof adapted to receive a tapered driver in frictional engagement.

---

The present invention relates to screws and combinations including the same in which the screw is particularly adapted for rapid application and also to be applied in a manner providing a degree of security in the sense that one can detect whether others have tampered with the screw.

In accordance with the invention, a screw is formed to include a cylindrical bore in its head, this cylindrical bore being adapted to be engaged by the tapered head of a driving instrument, especially one formed with radial flanges. The tapered head enters the cylindrical bore to support the screw and to rotate the same by frictional engagement with the wall of the bore. A feature of the invention is the fact that if, after application of the screw, the cylindrical bore is filled with a solid caulking composition which solidifies, this solid cannot be easily removed because of the cylindrical form of the bore. Since the solid filling must be removed or considerably defaced in order that the screw can be grasped with sufficient force to unscrew the same from its point of use, the fact of tampering is easily noted unless pains are taken to refill the bore. Further, and when a bore is employed for the driving and unscrewing of the screw, the enlarged head of the screw takes on considerably reduced significance and the invention includes the substantial elimination of the head in order that the screws may be assembled in a straight line, side by side, in the manner of bullets in a clip to be supplied one by one to an automatic screwing device. Similarly, and even in the absence of the clip, the screws may be glued together in side by side alignment, the forward movement of the driver breaking the adhesive bond.

Other and further features of the invention will become apparent from the description which follows, taken in conjunction with the accompanying drawings in which.

Figure 1:
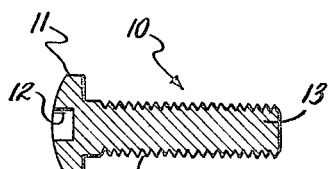
FIG. 1 is a sectional elevation showing a headed screw constructed in accordance with the invention.

Referring more particularly to FIG. 1, the numeral 10 broadly identifies a headed screw having a round head 11 essentially devoid of any gripable feature other than a cylindrical bore 12 which briefly extends into the head to a depth which limits the bore to the head portion of the screw. More particularly, the head 11 is round in transverse section and its exposed surface is smooth so that it is not easily driven by any ordinary screw driver. The stem 13 of the screw 10 is of conventional form, the numeral 14 identifying the threads which are, again, of any desired form.

While the screw pictured in FIG. 1 is particularly adapted for the securement of metal pieces, the invention is equally applicable to wood screws.

Figure 2:
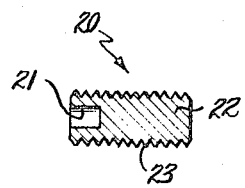
FIG. 2 is a sectional elevation showing a headless screw constructed in accordance with the invention.

FIG. 2 shows a screw similarly to that shown in FIG. 1 but in which the screw 20 does not include a head, the cylindrical bore 21 being formed in the rear of the stem 22 which is threaded as indicated at 23.

An important feature of the present invention is the provision of a tamper-resistant screw. In many instances, it is not desirable to have unskilled persons repairing delicate or dangerous structures. The screws of the invention requires special tools and, even when such tools are available, if the cylindrical bore is filled with some solid material, this solid must be removed in order that the tool can enter the bore and effectively drive the screw. Accordingly, and unless special efforts are made to replace the composition used to fill the bore, one can easily detect that the structure held together by the screw has been tampered with, providing a basis for voiding warranties, etc.

As will be evident, if the bores 12 or 21 were not cylindrical, e.g., if they were tapered so as to be of smaller diameter as they entered the head of the screw, a solid plugging element could be pulled out and reinserted. A reverse taper would not provide a practical screw structure because it would be difficult to form and unduly weaken the screw.

Figure 3:
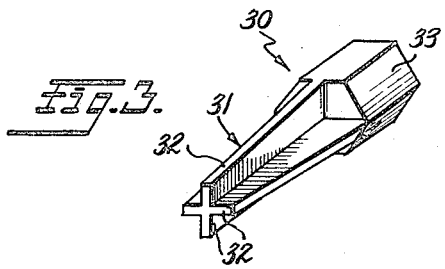
FIG. 3 is a partial perspective view showing a driving element useful to drive the screws of the invention.

An appropriate driving tool is shown in FIG. 3 in which the driving portion of the tool 30 is a forwardly tapering driver element 31 constituted by radial flanges 32, the radial flanges terminating at the forward end of the tool. The rear of the driving tool 30 is constituted by an hexagonal shank 33 by which the instrument is grasped, normally by a rotary power tool.

The forward end of the driving tool 30 is of small enough overall diameter to be inserted within the cylindrical bores 12 or 21 and, with a forward thrust, the radial flanges 32 bite into the periphery of the bore. In this manner, the screw is supported and can be advanced in such supported relation into its place of intended use. At the same time, there is a sufficient grip between the flanges 32 and the cylindrical bore of the screw as to enable a rotation of the driving tool to drive the screw home or, upon a reverse rotation, to unscrew the screw from its point of application.

It is stressed that contact between the driving tool and the bore of the screws occurs in a plurality of spaced apart points where the flanges of the driving tool can bite into the outermost periphery of the cylindrical bore.

Figure 4:
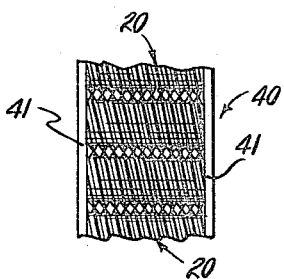
FIG. 4 is a partial sectional view of a clip containing screws of the type shown in FIG. 2.

The headless screws shown in FIG. 2 are of especial value since they are subject to vertical stacking and to transport by the driving tool so that they can be delivered from a stack to successive points of application. Thus, FIG. 4 shows a clip 40 containing a stack of side-by-side headless screws 20. The clip 40 is completely conventional, e.g., it would be exactly like any conventional clip for feeding bullets to an automatic or semiautomatic weapon. Accordingly, only the side walls 41 of the clip are shown.

Figure 5:
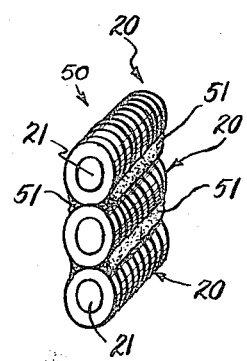
FIG. 5 is a perspective view showing adhesively connected screws of the type shown in FIG. 2.

Again, and because the head is eliminated in a structure capable of being held by interengagement between the forward end of the driving element and the cylindrical bore, the clip can be eliminated as shown in FIG. 5 by adhesively securing the individual screws 20 together as indicated by glue lines 51, forming a vertical stack which can be used to supply an automatic driving tool, the vertical stack being broadly identified by the numeral 50.

Once the screw has been screwed home, an effort may be made to create tamper resistance or not, as desired by inserting a hardenable mixture within the bore in the head end of the screw.

The composition which is inserted into the bore is desirably a paste-like mixture which hardens within the bore and can be aptly described as a caulking composition. As will be evident, the caulking composition may be inorganic or organic in nature and is subject to wide variation. While innumerable compositions will be immediately evident to those skilled in the art, ordinary hardening putty and wood filler composition are illustrative of the caulking compositions which are contemplated.

Figure 6:
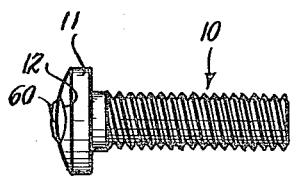
FIG. 6 is a side elevation of a screw having its cylindrical bore filled with caulking composition to deter tampering.

Referring to FIG. 6, the screw 10 has the caulking composition 60 inserted into the bore 12 of the head 11 where it can harden and provide the tamper resistance referred to hereinbefore.

It should be noted that when the head end of the screw is referred to, that this is intended to denote the end of the screw remote from the end which is to be inserted at the point of use, regardless of whether the screw is formed with an element which can be properly regarded as a head.

The invention is defined in the claims which follow.

I claim:

1. A separate clip element having parallel side walls containing a plurality of externally threaded rods adapted to be applied by rotation, said rods being of uniform major and minor diameters throughout their length to constitute headless screws, said headless screws having an uninterrupted cylindrical bore at one end thereof providing tool engaging means and being arranged in said clip in side-by-side contacting relation with the cylindrical bores thereof all positioned at one side of said clip, the end surfaces of said headless screws being coplanar at each side of said clip.

2. A stack of screw fasteners constituted by a plurality of externally threaded rods adapted to be applied by rotation, said rods being of uniform major and minor diameters throughout their length to constitute headless screws, said headless screws having an interrupted cylindrical bore providing tool engaging means at one end thereof and being secured in side-by-side relation with the cylindrical bores thereof all positioned at one side of said stack by means of readily frangible adhesive intervening between the adjacent surfaces of said screws, the end surfaces of said screws being coplanar at each side of said stack.

References Cited

UNITED STATES PATENTS

| | | | |
|---|---|---|---|
| 159,777 | 2/1875 | Sturtevant | 206—56 |
| 1,889,966 | 12/1932 | Whitehead | 206—46 |
| 2,385,777 | 10/1945 | Ebert | 206—46 |
| 2,599,011 | 6/1952 | Phipard | 206—46 |
| 1,372,291 | 3/1921 | Jacobs | 85—1 |
| 1,753,154 | 4/1930 | Martus | 85—1 |
| 1,327,587 | 1/1920 | Bliss | 85—45 |
| 1,908,080 | 5/1933 | Thompson | 85—45 |
| 2,244,046 | 6/1941 | Bradshaw | 85—45 |
| 2,294,463 | 9/1942 | Krantz | 85—17 |
| 2,873,641 | 2/1959 | Evans | 85—47 |
| 74,490 | 2/1868 | Bidwell | 85—45 |
| 1,296,165 | 3/1919 | Costuma | 85—41 |
| 1,777,936 | 10/1930 | Roberts | 85—45 |

FOREIGN PATENTS 638,195   5/1950   Great Britain.

CARL W. TOMLIN, *Primary Examiner.*

RAMON S. BRITTS, *Assistant Examiner.*

U.S. Cl. X.R.

85—1, 45; 145—50